United States Patent
Rosenquist et al.

(10) Patent No.: US 10,567,170 B2
(45) Date of Patent: Feb. 18, 2020

(54) HARDWARE-GENERATED DYNAMIC IDENTIFIER

(71) Applicant: McAfee, LLC, Santa Clara, CA (US)

(72) Inventors: Matthew L. Rosenquist, Folsom, CA (US); Igor Tatourian, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 79 days.

(21) Appl. No.: 14/757,894

(22) Filed: Dec. 24, 2015

(65) Prior Publication Data

US 2017/0187525 A1 Jun. 29, 2017

(51) Int. Cl.
| | |
|---|---|
| *H04L 29/06* | (2006.01) |
| *H04L 9/08* | (2006.01) |
| *H04L 9/32* | (2006.01) |
| *H04L 9/06* | (2006.01) |
| *H04L 9/14* | (2006.01) |

(52) U.S. Cl.
CPC ............ *H04L 9/0861* (2013.01); *H04L 9/065* (2013.01); *H04L 9/083* (2013.01); *H04L 9/0877* (2013.01); *H04L 9/14* (2013.01); *H04L 9/3226* (2013.01); *H04L 9/3263* (2013.01); *H04L 63/062* (2013.01); *H04L 63/1441* (2013.01)

(58) Field of Classification Search
CPC ......... H04L 9/0861; H04L 9/065; H04L 9/14; H04L 63/062; H04L 63/1441
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,414,884 B1* | 7/2002 | DeFelice | G06F 21/75 257/922 |
| 6,460,050 B1 | 10/2002 | Pace et al. | |
| 7,506,155 B1 | 3/2009 | Stewart et al. | |
| 2002/0124176 A1* | 9/2002 | Epstein | G06Q 20/341 713/186 |
| 2004/0250092 A1* | 12/2004 | Hori | G06F 21/10 713/189 |
| 2007/0095927 A1 | 5/2007 | Pesonen | |
| 2011/0145598 A1* | 6/2011 | Smith | G06F 21/554 713/190 |
| 2013/0129087 A1 | 5/2013 | Qi et al. | |

(Continued)

FOREIGN PATENT DOCUMENTS

WO 2017112203 A1 6/2017

OTHER PUBLICATIONS

International Search Report and Written Opinion issued in PCT Application No. PCT/US2016/062990 dated Feb. 28, 2017; 11 pages.

*Primary Examiner* — Jeffrey C Pwu
*Assistant Examiner* — Thong P Truong
(74) *Attorney, Agent, or Firm* — Patent Capital Group

(57) ABSTRACT

In an example, there is disclosed an electronic apparatus, comprising: a hardware-encoded internal private key; and one or more logic elements comprising a key generation engine to: receive an third-party key; and operate on the third-party key and the internal private key to generate a hardware-generated dynamic identifier (HGDI). There is also disclosed a method of providing an HGDI engine, and one or more computer-readable mediums having stored thereon executable instructions for providing an HGDI.

21 Claims, 6 Drawing Sheets

(56) References Cited

U.S. PATENT DOCUMENTS

| | | | |
|---|---|---|---|
| 2013/0290704 A1 | 10/2013 | Giniger et al. | |
| 2014/0047238 A1 | 2/2014 | Harty et al. | |
| 2014/0189890 A1* | 7/2014 | Koeberl | G06F 21/70 726/34 |
| 2014/0304786 A1* | 10/2014 | Pei | G06F 21/44 726/6 |

* cited by examiner

HARDWARE-GENERATED DYNAMIC IDENTIFIER

FIELD OF THE SPECIFICATION

This disclosure relates in general to the field of computer security, and more particularly, though not exclusively to, a system and method for providing a hardware-generated dynamic identifier.

BACKGROUND

Certain existing electronic devices, such as processors, network interface cards, or other circuits, may self-identify themselves with a static device identifier. For example, a CPU may have a hard-coded device ID embedded within it. A network interface card (NIC) may include a media access control (MAC) address hard coded into it.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
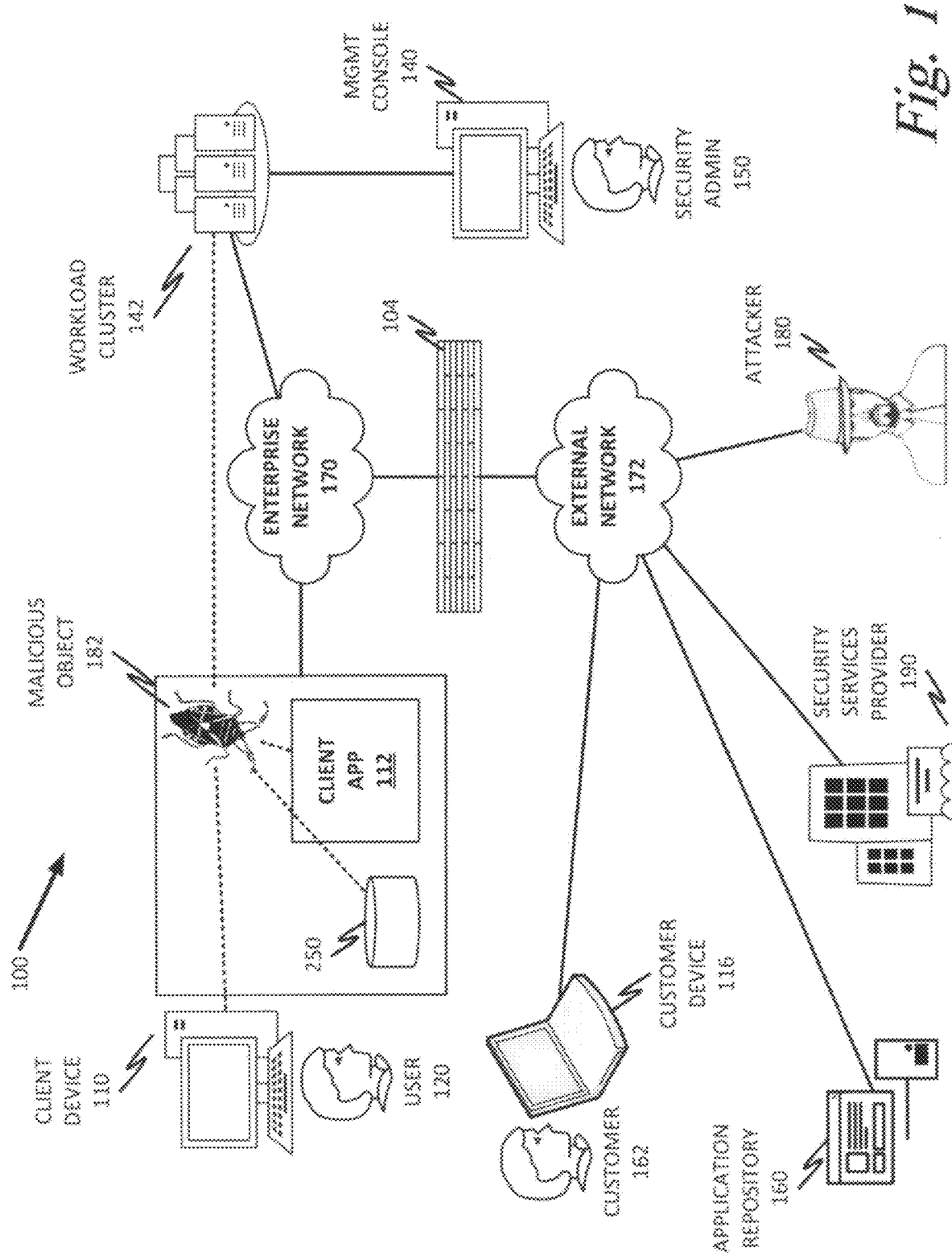
FIG. 1 is a block diagram of a secured enterprise according to one or more examples of the present specification.

In an example, there is disclosed an electronic apparatus, comprising: a hardware-encoded internal private key; and one or more logic elements comprising a key generation engine to: receive an third-party key; and operate on the third-party key and the internal private key to generate a hardware-generated dynamic identifier (HGDI). There is also disclosed a method of providing an HGDI engine, and one or more computer-readable mediums having stored thereon executable instructions for providing an HGDI.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

According to embodiments of this specification, a computing device or other apparatus can generate an arbitrary number of dynamic, persistent, globally-unique (or pseudo-unique) device identifiers. Features of the identifier include, by way of nonlimiting example:

a. Arbitrary number—The computing device can generate any suitable number of IDs. Thus, for each third-party device that seeks to identify the first device, the first device can generate an ID dedicated exclusively to that third device. Furthermore, in some cases, a temporary ID may be generated for a specific transaction, such as a network socket.

b. Dynamic—The ID for the device is generated on-the-fly for approved software and services, rather than stored, such as in non-volatile memory.

c. Private—An administrator or user of the device controls compartmentalized identities, so that there is no need for private user data or name/password pairs. The administrator or user controls access between the requestor and the embedded HGDI system d. Persistent—Because the dynamic ID is seeded, the same value can be persistently re-generated simply by using the same seed. This may be done with a one-way hash (e.g., the ID can be generated from the seed, but the seed cannot be reverse engineered from the hash). In one embodiment, the unique ID generator is hard-coded into silicon, so that IDs remain consistent even after reboot, data deletion, change of operating system, software uninstall, or even a re-flashed firmware, or use of a virtual machine.

e. Globally Unique or Pseudo-Unique—The ID generated by the device may be globally unique, or the degree of entropy may be high enough that the ID is pseudo-unique, meaning that there is extremely low probability that two devices will generate the same pseudo-unique ID, even lower probability that they will do so in a context where there is a collision, and near-zero probability that an attacker could intentionally do so as part of an attack.

f. Secure—Silicon-based passive security may be provided, with attack sensors, and no data or key storage. Thus, the ID may be very difficult to undermine via the operating system or software.

The foregoing attributes are provided by way of nonlimiting example. Such an ID may be referred to throughout this specification as a "hardware generated dynamic identifier" (HGDI), though it should be understood that not all HGDIs must necessarily possess all of the foregoing attributes, and that some HGDIs may possess additional beneficial attributes.

HGDIs may be used for a variety of purposes, including by way of nonlimiting example, asset tracking and management, software anti-piracy licensing, supply chain attestation, network access controls, second-factor transaction authentication, user privacy, and data protection (including data loss prevention, enterprise resource management, and digital rights management).

In an example, each of a plurality of devices is built with a unique HGDI engine permanently built into hardware, such as burned into silicon. There may be common elements between all of the HGDI engines, including the logic for HGDI generation. However, each one, also has permanently stored within it, in silicon, a unique or pseudo-unique internal private key. This internal private key may be generated on-the-fly during production so that even the manufacturer does not know and cannot know the internal private key of each device. This can be accomplished by selectively triggering permanent fuses in a fuse array to generate a value for the internal private key. Once the private key is generated, the only way to "read" it is through cumbersome and likely destructive means, such as using a scanning electron microscope to examine the fuses. In an example, Intel® Hanalei Valley or a similar existing method may be used to perform the "fuse blowing" to generate an HGDI internal private key.

When a third-party device wishes to authenticate itself to the first device, the third-party device may be provisioned with a third-party key. Provisioning a third-party key can take one of several forms. For example, the third party itself may generate its own third-party key. The third party may request a third-party key from the first device, and the first device may dynamically generate a unique or pseudo-unique third party key, which it can then send to the third party. Or a trusted intermediate key authority may provision a third-party key to the third party.

Advantageously, the third-party key need not be encrypted or hidden. The third-party can send the third-party key in clear text and in the open. When the first device receives the third-party key, it uses the HGDI engine to generate the HGDI for that third-party key, and then sends the encrypted HGDI to the third party. The third party can then decrypt the HGDI and compare it to its own stored copy of the HGDI to verify that the first device is genuine.

Keeping the third-party key in the clear can in fact act, in some cases, as an additional security measure. Clear-text third-party keys may act as an invitation for attackers to attempt to tamper with the system, and those attempts may be detected and mitigated.

In an embodiment, a network or security administrator of an enterprise may have visibility into the overall system. The network administrator can watch third-party keys entering the network, and can watch encrypted "blobs" being passed back in response. The network administrator can see and manage who can request, and who has requested identifiers in the past. Thus, the administrator has a great degree of control over the ecosystem.

A processor with a built-in HGDI engine is discussed above as an example, but other parts of a device may also include an HGDI. For example, in some high-security contexts, it is important to be able to ensure that a computer has not been tampered with, including any "plug-in" modules, such as the motherboard, a network card, graphics, card, or other device. In that case, each component that needs to be tracked may include its own HGDI engine so that each can be tracked and verified.

Potential applications of an HGDI include, by way of non-limiting example:
a. Localized multi-factor authentication.
b. Localized key generation and provisioning.
c. Localized source code validation.
d. Security independent software vendor (ISV) integration.
e. Identity provision and revocation.
f. Proxy validation.
g. Source validation services.
h. Cyber supply chain ID tracking and data ecosystems.
i. ISV software licensing and protection.
j. Digital rights managements.
k. Internet ID authorized transaction security (e.g., for banking).
l. Asset tracking, management, and hardening assurance.
m. Local system ID and authorization services.
n. Data loss prevention.
o. Enterprise resource management.
p. Supply-chain management.

In defense and security contexts especially, an HGDI can be used to track exactly who has used a machine, and what it has been used for. For example, consider a case of a government agency where machines may be transferred between different departments. Some users may have higher security clearances, and some lesser or no security clearance. If a machine is transferred from a cleared operator to an uncleared operator, HGDI can uniquely identify the machine so that the agency can ensure that appropriate measures are taken to destroy classified data before the transfer happens. Similarly, a government agency may need to verify that its hardware and software are genuine and have not been tampered with. An HGDI engine can be queried to verify that original hardware has remained intact. In an enterprise security context, an HGDI may be used to provide fine-grained security policies. For example, a firewall may be provided that allows a particular resource to be accessed only by specific machines. Advantageously, because the HGDI engine may be encoded in hardware, that machine can be recognized even if the user is operating via a VM or other virtual environment, and even if the hard drive has been reformatted or the BIOS re-flashed.

A system and method for providing a hardware-generated dynamic identifier will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In this example, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

Customer 162 may also operate a customer device 116 to access network resources, such as via external network 172. Customer device 116 may also include an HGDI engine as appropriate.

Figure 2:
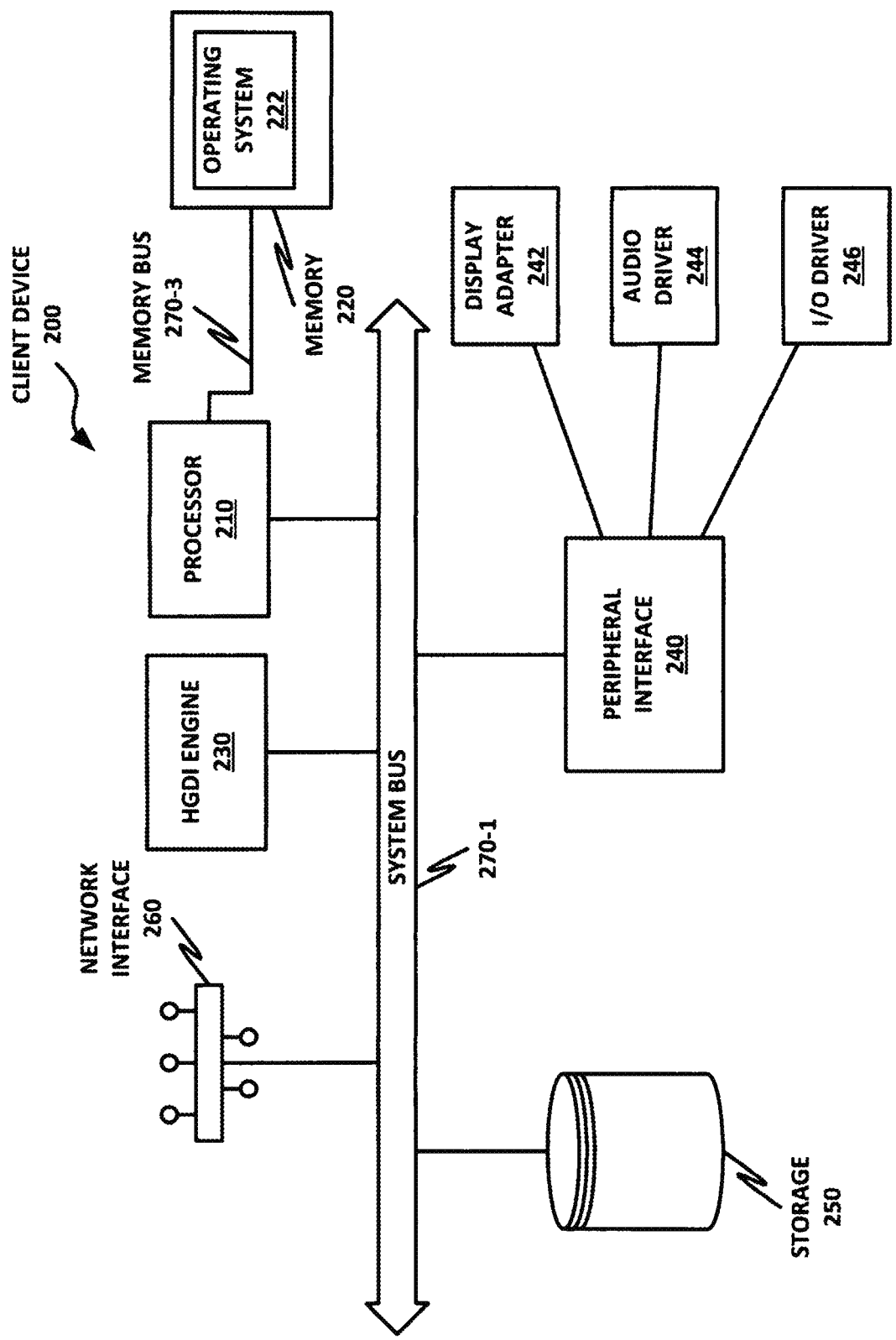
FIG. 2 is a block diagram of a client device according to one or more examples of the present specification.

In this example, client devices 110 and customer devices 116 may each be a "first device" as described above. In other words, client device 110 and customer devices 116 may include an HGDI engine 230 as illustrated in FIG. 2.

For example, as asset management server within workload cluster 142 may be configured to track all machines owned and operated by secured enterprise 100. The asset management server may have an HGDI store 352 (FIG. 3), including a third-party key to generate an HGDI for client device 110, and a stored copy of the resultant HGDI. Thus, if the asset management server wants to authenticate or verify client device 110, it may send the clear-text third-party key, and receive back the encrypted HGDI, thus verifying the asset.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. While workload cluster 142 is shown as physically belonging to secured enterprise 100 in this illustration, in some embodiments workload cluster 142 could be or could include a data center operated by a third party in which data center services are outsourced.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources. In those cases, an HGDI engine may be used, for example, to track which physical device a client is operating on. This could be used, for example, in allocating and billing out data center resources by tracking the physical resources consumed by a particular client.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author, whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation. HGDIs may be effective in preventing malware attacks, as devices can be uniquely identified to one another.

Attacker 180 may also want to commit industrial or other espionage against secured enterprise 100, such as stealing classified or proprietary data, stealing identities, or gaining unauthorized access to enterprise resources. In other embodiments, attacker 180 may wish to commit software piracy (to duplicate or fraudulently install and use unpaid—for licensed software), or commit impersonation, hijacking, or fraud, or to undermine the integrity of data, web browsing, or network connectivity. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although he is not necessarily malicious, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110. Also, software authors for application repository 160 may wish to provide DRM or other anti-piracy measures to ensure that they get paid for their work. And secured enterprise 100 may have an interest in ensuring that all software deployed on its network is properly licensed, to avoid interference from auditing groups, such as "The Software Alliance." Thus, an HGDI may be used to uniquely and reliably associate software licenses with specific machines.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign. Security services provider 190 may also be a trusted broker that manages allowed connections and that issues third-party keys. In one example, client device 110 and customer device 116 may be configured to reject attempts to connect to the HGDI engine unless signed by a trusted key.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, HGDI can be used to enumerate the devices on the network as part of asset management or simply understanding who has connectivity to physical and logical network layers. A security appliance in cluster 142 may then query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 and customer devices 116 may all be examples of client devices 200.

Client device 200 includes a processor 210 connected to a memory 220, having stored therein executable instructions for providing an operating system 222 and at least software portions of a HGDI engine 230. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. It should be noted that an HGDI of the present specification may work in both general-purpose processors, and in dedicated security processor. It may also support trusted execution environments. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of HGDI engine 230. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

HGDI engine 230, in one example, is operable to carry out computer-implemented methods as described in this specification. HGDI engine 230 may include one or more tangible non-transitory computer-readable mediums having stored thereon executable instructions operable to instruct a processor to provide a HGDI engine 230. As used throughout this specification, an "engine" includes any combination of one or more logic elements, of similar or dissimilar species, operable for and configured to perform one or more methods provided by the engine. Thus, HGDI engine 230 may comprise one or more logic elements configured to provide the HGDI generation methods disclosed in this specification.

In some cases, HGDI engine 230 may include a special integrated circuit or co-processor designed to carry out a method or a part thereof, and in some embodiments may also include software or firmware instructions to instruct a processor to perform the method. In some cases, a software portion of HGDI engine 230 (or a program designed to operate along with HGDI engine 230), such as a user agent, may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that HGDI engine 230 may also include other hardware and software, including configuration files, registry entries, and interactive or user-mode software by way of non-limiting example.

Figure 4A:
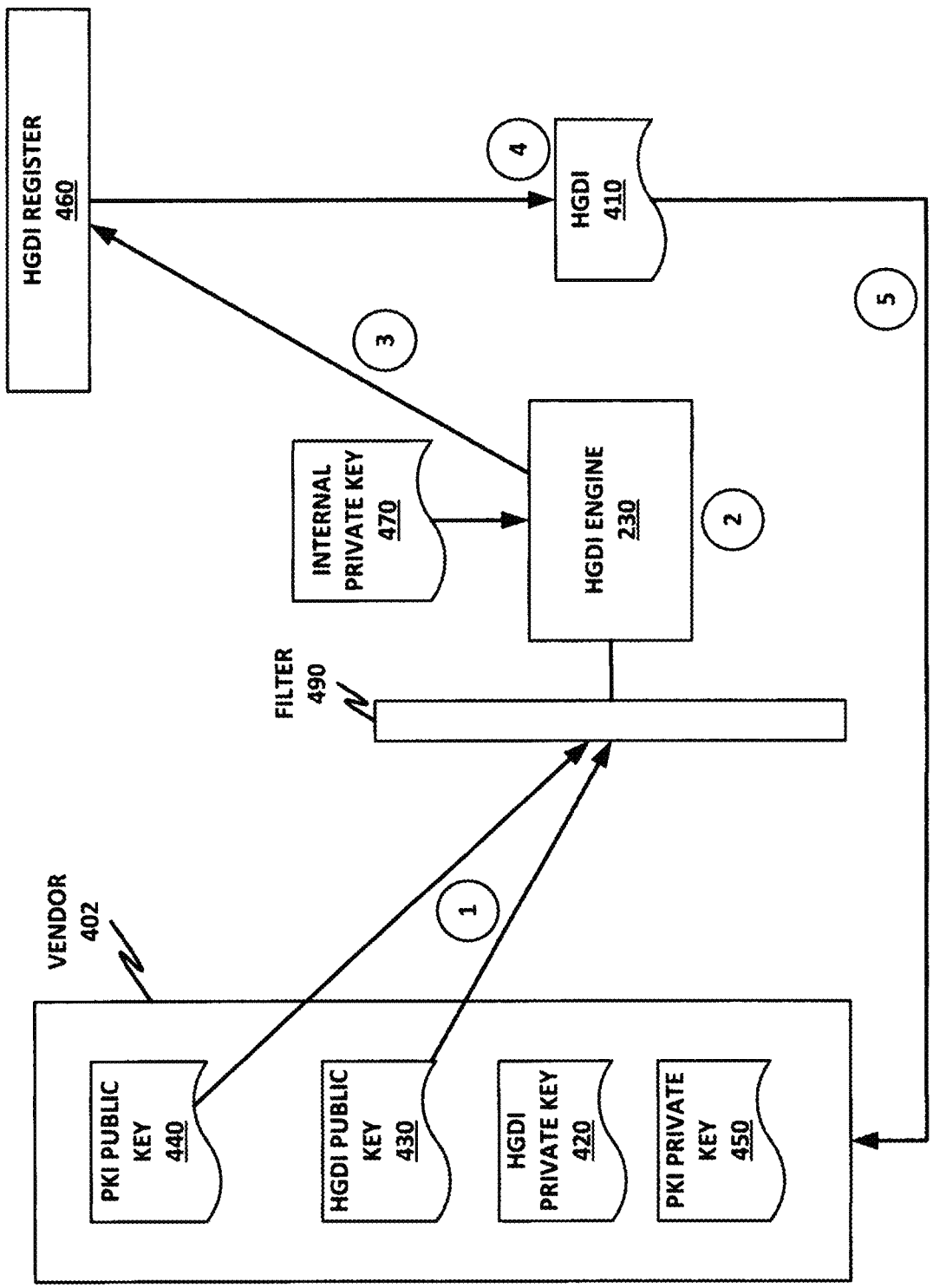
FIG. 4A is a block diagram of a hardware-generated dynamic identifier engine according to one or more examples of the present specification.

In one example, HGDI engine 230 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of HGDI engine 230 to provide the desired method. In some embodiments, the non-transitory medium includes immutable hardware logic elements, as illustrated in the embodiment of FIG. 4A, in which internal private key 470 is programmed by or derived from fuses, and HGDI engine 230 includes logic primitives programmed directly into silicon.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI., USB, Bluetooth or Wi-Fi audio, by way of non-limiting example.

Figure 3:
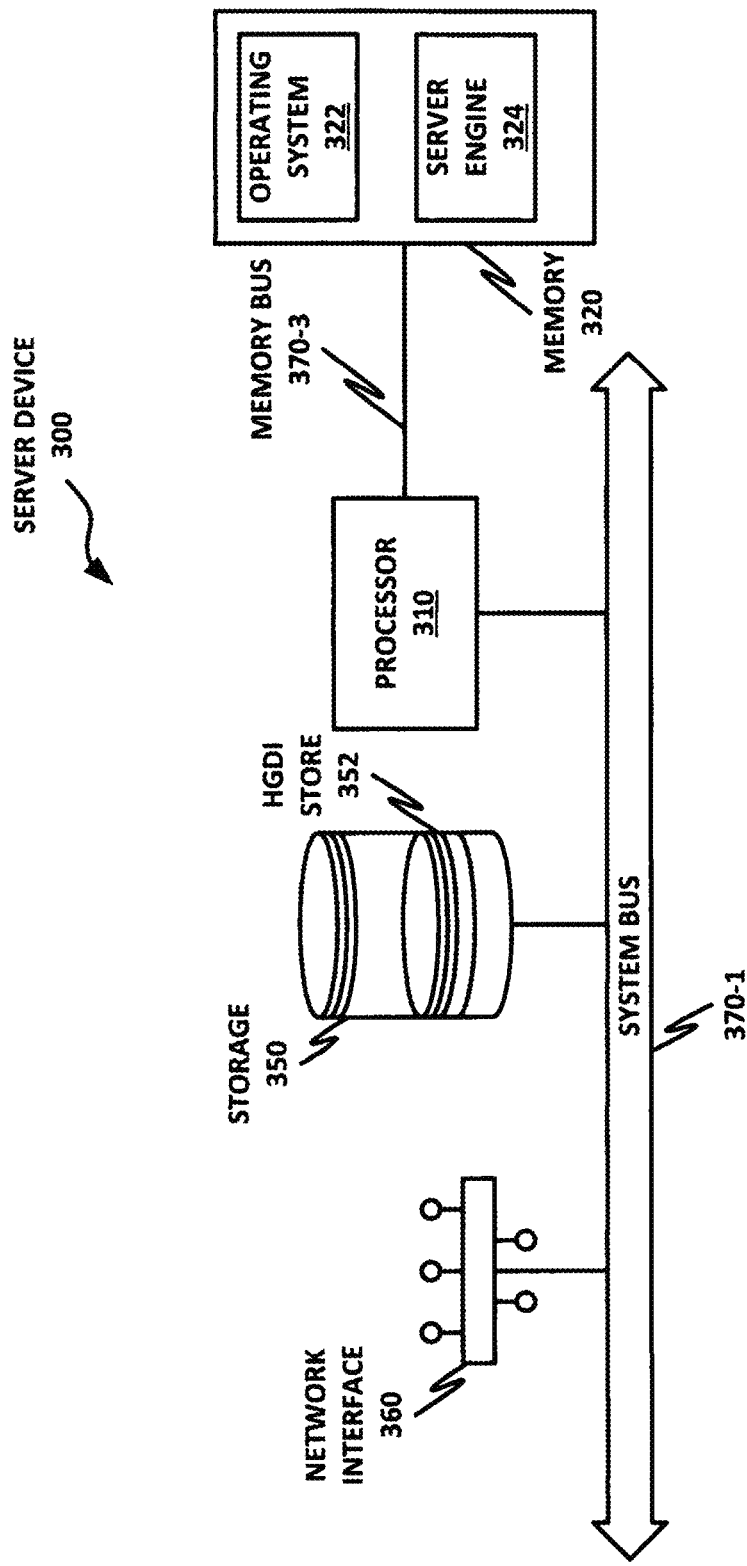
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a server engine 324. Other components of server 300 include a storage 350, and network interface 360. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324. Storage 350 may have stored thereon an HGDI store 352, which may include stored copies of HGDIs associated with specific devices, as well as correlated information, such as software licenses tied to those HGDIs, or other data correlated with the HGDIs.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 *and load it into memory 320. Processor 310 may then iteratively execute the instructions of server engine 324 to provide the desired method.

Server engine 324 may be configured to interact with HGDI engine 230 of FIG. 2 and to verify computing device 200 via HGDI 410 (FIG. 4A).

FIG. 4A is a block diagram of a HGDI system according to one or more examples of the present specification. In this embodiment, an HGDI engine 230 is provided, which may be encoded within processor 210, or within any other suitable system, subsystem, or component. HGDI engine 230 includes an internal private key 470, which is unique or pseudo-unique to HGDI engine 230. The remainder of HGDI engine 230—for example, the logic and interfaces—may be common across a class of devices.

Figure 4B:
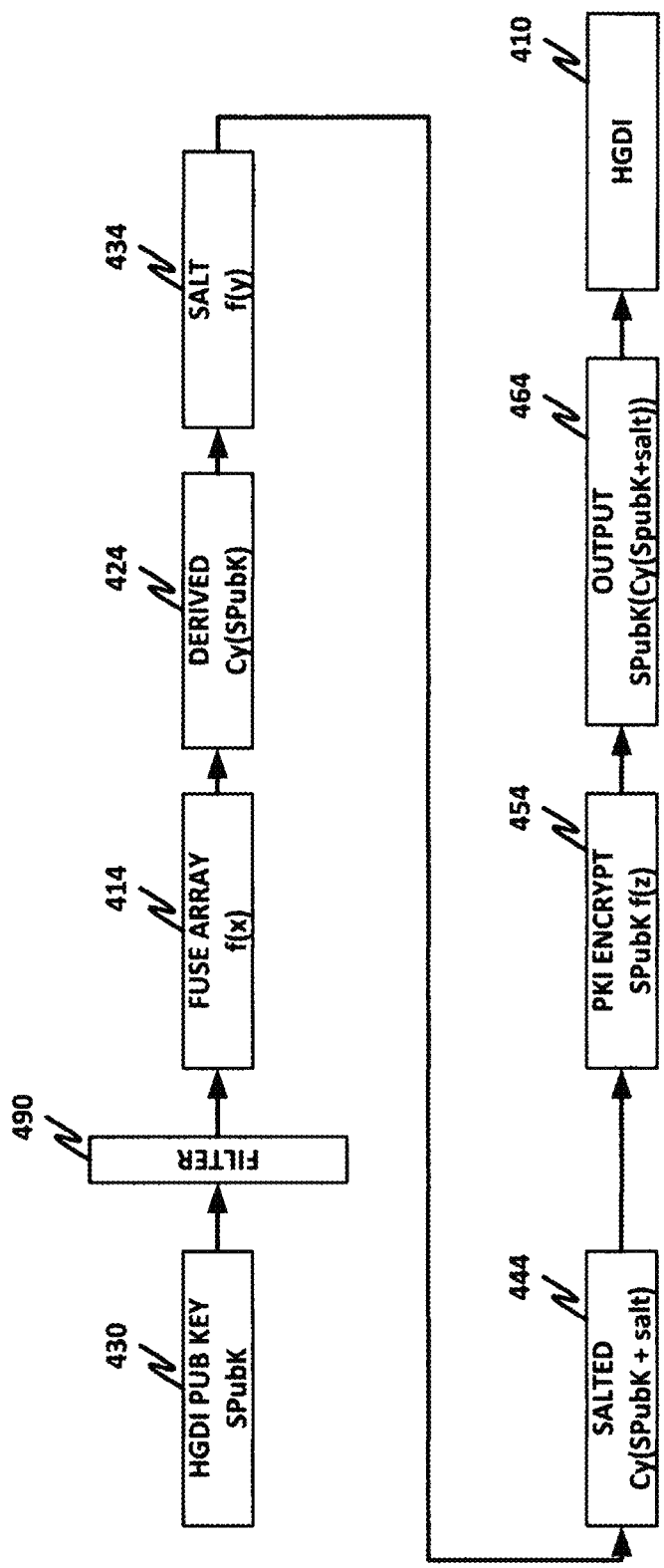
FIG. 4B provides additional details of a hardware-generated dynamic identifier according to one or more examples of the present specification.

Internal private key 470 may be derived according to the chain illustrated in more detail in FIG. 4b. This may include selectively and randomly or pseudo-randomly blowing fuses as part of the manufacturing process. In certain embodiments, particularly embodiments involving mass production, random variables in the manufacturing process itself may be used to determine the fuse blow pattern. The derived fuse blow pattern is not stored or recorded, and no interface may be provided for reading out the pattern. And as HGDI engine 230 may use a non-reversible process to derive an HGDI 410 from the fuse blow pattern, it is very difficult for any party to determine the internal private key 470 of a particular device short of destructively examining the silicon wafer, such as in a scanning electron microscope. Furthermore, the fuse blow pattern may not be used directly as internal private key 470. As illustrated in FIG. 4B, the actual internal private key 470 may be several steps removed from the fuse blow pattern, thus further insulating the device from reverse engineering of its value. Furthermore, HGDI engine 230 may include a counter or other timing engine to prevent "replay" attacks, in which an attacker re-sends an old response that it has intercepted. Replay attacks may also be mitigated via one-time keys or any other suitable means.

In an embodiment, vendor 402 holds a PKI private key 450 and PKI public key 440, which may be existing, known PKI keys. Note that the use of separate PKI keys is optional. Vendor 402 also holds an HGDI public key 430 and HGDI private key 420.

At operation 1, vendor 402 HGDI public key 430 and optionally PKI public key 440 to HGDI engine 230. PKI public key 440 may be used in cases where there is a reason to have a separate encryption key, though in some embodiments, HGDI public key 430 may serve both as a key to generate HGDI 410, and as an encryption key to encrypt HGDI 410. Filter 490 may be placed in certain embodiments to ensure that HGDI public key 430 is a valid HGDI public key. For example, HGDI public keys may be issued by an issuing authority such as security services provider 190, and filter 490 may ensure that HGDI public key 430 has been issued by a valid authority and has not been revoked. This may be similar to existing methods by which PKI or secure socket layer (SSL) certificates are managed and issued.

At operation 2, HGDI engine 230 receives HGDI public key 430, and using internal private key 470, generates an HGDI 410.

At operation 3, HGDI engine 230 encrypts HGDI 410, either with HGDI public key 430, or PKI public key 440, as appropriate to the embodiment.

At operation 4, HGDI engine 230 may publish the HGDI public key 430 and HGDI 410 to one or more memory locations, such as an HGDI register 460. Note that HGDI register 460 need not be restricted. In certain embodiments, any process running on computing device 200 can read HGDI register 460. This may be of interest to security researchers, as the ability to read HGDI 410 should not, in theory, represent a security concern. This enables client-side programs on computing device 200 to monitor the HGDI generation, including security daemons and user-space programs.

At operation 5, HGDI engine 230 provide the encrypted HGDI key 410 to vendor 402.

In certain embodiments, from a security perspective, HGDI engine 230 and related functions are completely passive. In other words, HGDI engine 230 may have no rights to modify, write to, interrupt, or interfere with the system, except for writing a value to HGDI register 460. Because it has no other rights or permissions on the system (write to disk, launch an application, etc.), HGDI engine 230 is a less desirable target for attackers seeking escalation of privileges or other avenues of side-channel access.

Other system components may make appropriate decisions about what to do with HGDI 410. Thus, HGDI engine 230's primary, and possibly sole, function is to receive an HGDI public key input and generate an HGDI output, which it writes to a register or other memory location, and then takes no further action. Thus, even if an attacker 180 is able to completely compromise HGDI engine 230, there is no security aperture, because HGDI engine 230 can only generate an HGDI and write it to the assigned memory location.

FIG. 4B is a block diagram that illustrates the logic of generating HGDI 410 according to one or more examples of the present specification. Specifically, the blocks of FIG. 4B may represent operations to make while initially generating internal private key 470, or they may represent operations that are performed on-the-fly each time internal private key 470 is generated.

HGDI public key 430 is first received. HGDI public key 430 may be referred to mathematically as SPubK, the "source public key."

Filter 490 ensures that only validly-issued public keys are permitted into HGDI engine 230.

Fuse array 414, referred to mathematically as f(x), is the source of HGDI internal private key 470. Note that while fuse array 414 may represent a large integer programmed by the fuses, that large integer need not always be used directly as HGDI internal private key 470. In some embodiments, HGDI internal private key 470 can be derived from the fuse value. The function f(x) may be a one-way function to derive internal private key 470 from the fused value.

Derived block 424 is a function to derive a cypher of SPubK (Cy(SPubK)) and the output of f(x) from block 414. In certain embodiments, this is the unencrypted value of HGDI 410.

Block 434 is a salt value f(y). This may be used to help ensure that the final output is unique, and to protect derived value 424 from being reverse engineered.

Block 444 is a salted derived value Cy(SPubK+salt).

Block 454 is an encrypted salted cypher. The encryption key may be either HGDI public key 430 or PKI public key 440. The function may be a standard public key encryption function. An incremental counting feature may also be provided to mitigate against replay or caching attacks.

The final output is SPubK(Cy(SpubK+salt)), which is stored as HGDI 410. This output is unique or pseudo-unique, and can be recovered via SPriK( ) (source private key).

Figure 5:
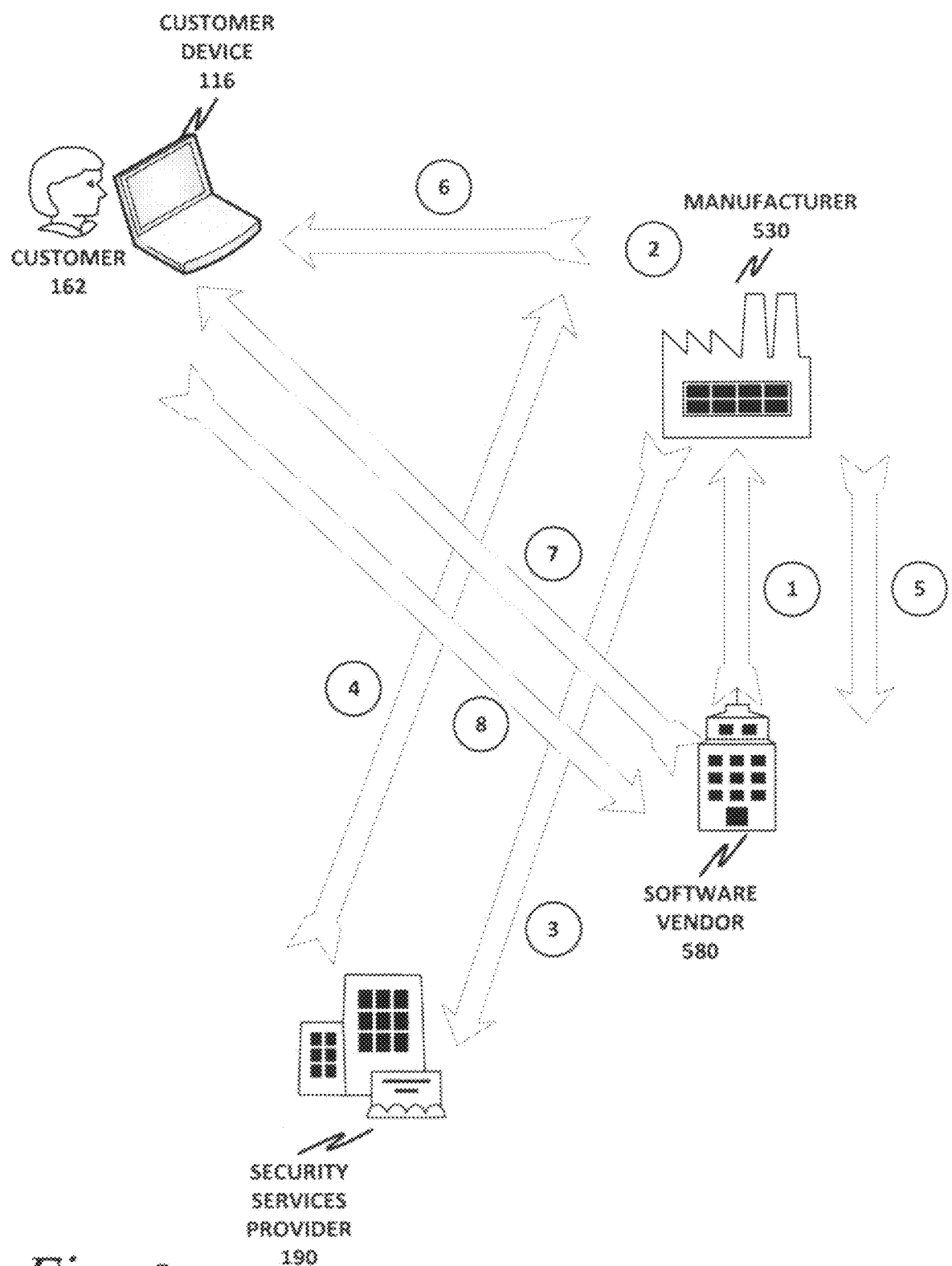
FIG. 5 is a block diagram of a manufacturing ecosystem according to one or more examples of the present specification.

FIG. 5 is a block diagram of a manufacturing ecosystem according to one or more examples of the present specification. In the example of FIG. 5, manufacturer 530 intends to manufacture hardware, such as a computer that is pre-installed with software provided by software vendor 580.

In this example, it is assumed that security services provider 190 is to act as a key broker, and that software vendor 580 and manufacturer 530 both have existing, valid accounts with security services provider 190.

In operation 1, software vendor 580 provides to manufacturer 530 licensed software, including in this example a license that is valid for one processor.

In operation 2, manufacturer 430 manufactures customer device 116, and pre-installs the licensed software. This may be or comprise an operating system, or operational software such as an office suite, web browser, social media software, or similar. In some cases, customer device 116 may be an engineering or artistic workstation, and may include software appropriate to that purpose, which in some cases may be very expensive.

In operation 3, manufacturer 530 requests an HGDI public key 430 from security services provider 190.

In operation 4, security services provider 190 returns an HGDI public key 430. Note that this key may be unique or pseudo-unique to the specific request, and when used with HGDI engine 230 of customer device 116, generates an HGDI 410. Also note that manufacturer 530 could install software from a plurality of software vendors 580, and may request an HGDI 410 for each installation. Thus, each software vendor may have its own HGDI 410 for each customer device 116.

In operation 5, manufacturer 530 may share HGDI public key with software vendor 580. Note that this communication need not be secured. Indeed, manufacturer 530 could simply post HGDI public keys 430 to a public website, as HGDI public keys 430 will only generate the valid HGDI 410 if used on the correct, specific customer device 116.

In operation 6, manufacturer 530 ships customer device 116 to customer 162.

In operation 7, software vendor 580 may later need to verify the correct licensed installation of software on customer device 116. Thus, software vendor 580 sends HGDI public key 430 to customer device 116. As before, this transaction may be performed in clear text.

In operation 8, customer device 116 sends back to software vendor 580 the HGDI 410 that it generates from HGDI public key 430. This may be encrypted. Software vendor 580 now has verification that the license for customer device 116 is genuine.

This may also be used for other purposes than software licensing. For example, a social media application may be installed on customer device 116. For increased security, a more cumbersome multi-factor authentication may be required on "unknown" machines, such as a username and password in conjunction with an out-of-band verification code, such as one sent via text to a listed phone number. However, once user 162 has strongly authenticated once, and indicated that customer device 116 is a machine that he regularly uses, software vendor 580 may not require multi-factor authentication as long as customer 162 continues to use customer device 116. In some cases of single-user devices, further authentication may not be required anymore at all. Rather, the device may authenticate itself, taking the place of user authentication. Many other uses for HGDI 410 are possible, and are intended to be encompassed within the broad scope of this description.

Note, however, that in the case of consumer-grade devices, customer 162 may have the same capabilities as security administrator 150 of FIG. 1. Specifically, customer 162 may be able to see HGDI requests coming in, and may selectively decide to allow all, some, or none of them as he deems necessary. Note however that HGDI 410 may be encrypted with a public/private key pair, where the private key is held by software vendor 580, so that even customer 162 cannot view HGDI 410. Only software vendor 580 can view and decrypt HGDI 410.

Alternatively, customer 162 may have purchased customer device 116 from a third-party, and customer 162 may want to verify for himself that the software on customer device 116 is genuinely licensed. Thus, in an example, customer 162 may initiate a transaction, in which customer 162 can provide the public keys for manufacturer 530 and/or security services provider 190, which can then be used to generate one or more HGDIs 410. Customer 162 can then request that software vendor 580 and/or manufacturer 530 verify the authenticity of customer device 116 or installed software.

In certain contexts, such as defense contexts, such a mechanism can also be used to verify that a machine has not been tampered with when being transferred from one group or department to another.

Note also that because PKI infrastructure is used, private keys can also be revoked. For example, if manufacturer 530 were to have its private key compromised so that its security is no longer valid, security services provider 190 can revoke the private key according to known PKI methods, and can re-issue a new private key. Manufacturer 530 may then rebuild valid HGDIs 410 with affected devices such as customer device 116. Advantageously, HGDI engine 230 need not know or care about the key compromise. HGDI engine 230 can simply respond to whatever HGDI public key 430 that it receives to produce an HGDI 410.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit. (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations,' alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, an electronic apparatus, comprising: a hardware-encoded internal private key; and one or more logic elements comprising a key generation engine to: receive an third-party key; and operate on the third-party key and the internal private key to generate a hardware-generated dynamic identifier (HGDI).

There is further disclosed an example, wherein the one or more logic elements are immutable hardware logic elements.

There is further disclosed an example, wherein the key generation engine is further to encrypt the HGDI.

There is further disclosed an example, wherein the key generation engine is further to encrypt the HGDI with a salt.

There is further disclosed an example, further comprising a filter to reject third-party keys not provided by a key authority.

There is further disclosed an example, wherein the key generation engine is passive.

There is further disclosed an example, wherein the key generation engine has write permission only to one or more special-purpose memory locations for storing the HGDI.

There is further disclosed an example, wherein the one or more special-purpose memory locations are not read restricted.

There is further disclosed an example, wherein the one or more special-purpose memory locations are not read restricted to system-level resources.

There is further disclosed an example, wherein the internal private key is encoded within the electronic apparatus so as to make the internal private key not reasonably directly readable.

There is further disclosed an example, wherein the internal private key is encoded within the electronic apparatus so as to make the internal private key not reasonably directly readable without destructively examining the electronic apparatus.

There is further disclosed an example, further comprising means to mitigate a replay attack.

There is further disclosed an example, wherein the means comprise a temporal counter.

There is further disclosed in an example, one or more tangible, non-transitory computer-readable storage mediums having stored thereon executable instructions for a processor to: provide an internal private key; receive an third-party key; and operate on the third-party key and the internal private key to generate a hardware-generated dynamic identifier (HGDI).

There is further disclosed an example, wherein the storage medium comprises immutable hardware logic elements.

There is further disclosed an example, wherein the instructions are further to encrypt the HGDI with a salt.

There is further disclosed an example, wherein the instructions are further to reject third-party keys not provided by a key authority.

There is further disclosed an example, wherein the instructions are to write only to one or more special-purpose memory locations for storing the HGDI.

There is further disclosed an example, wherein the one or more special-purpose memory locations are not read restricted to system-level resources.

There is further disclosed an example, wherein the internal private key is provided within the electronic apparatus so as to make the internal private key not reasonably directly readable.

There is further disclosed an example, wherein the internal private key is provided within the electronic apparatus so as to make the internal private key not reasonably directly readable without destructively examining the electronic apparatus.

There is further disclosed an example, wherein the instructions are further to mitigate a replay attack.

There is further disclosed an example, wherein the instructions are further to mitigate a replay attack comprising inspecting a temporal counter.

There is further disclosed in an example, a method of providing a hardware-generated dynamic identifier (HGDI) in an immutable hardware logic element of an electronic device, comprising: providing a hardware-encoded internal private key; receiving a third-party key; and operating on the third-party key and the internal private key to generate a hardware-generated dynamic identifier (HGDI).

There is further disclosed an example, further comprising encrypting the HGDI.

There is further disclosed an example, further comprising encrypting the HGDI with a salt.

There is further disclosed an example, further comprising filtering to reject third-party keys not provided by a key authority.

There is further disclosed an example, further comprising writing the HGDI only to one or more special-purpose memory locations for storing the HGDI.

There is further disclosed an example, wherein the one or more special-purpose memory locations are not read restricted.

There is further disclosed an example, wherein the one or more special-purpose memory locations are not read restricted to system-level resources.

There is further disclosed an example, wherein providing the internal private key comprises encoding the internal private key within the electronic device so as to make the internal private key not reasonably directly readable.

There is further disclosed an example, wherein providing the internal private key comprises encoding the internal private key within the electronic device so as to make the internal private key not reasonably directly readable without destructively examining the electronic device.

There is further disclosed an example, further comprising mitigating against a replay attack.

There is further disclosed an example, further comprising mitigating against a replay attack comprising operating a temporal counter.

There is further disclosed an example, wherein providing the internal private key comprises deriving the internal private key from a value encoded in hardware.

There is further disclosed an example, wherein deriving the internal private key from the value encoded in hardware comprises applying a one-way function to the value encoded in hardware.

There is further disclosed in an example, a method of providing a hardware-generated dynamic identifier comprising performing some or all of the operations of any of the foregoing examples.

There is further disclosed in an example, an apparatus comprising means for performing the method.

There is further disclosed an example, wherein the means for performing the method comprise a processor and a memory.

There is further disclosed an example, wherein the memory comprises machine-readable instructions, that when executed cause the apparatus to perform the method.

There is further disclosed an example, wherein the apparatus is a computing system.

There is further disclosed in an example, at least one computer readable medium comprising instructions that, when executed, implement a method or realize an apparatus as claimed in any of the foregoing examples.

What is claimed is:

1. An electronic apparatus, comprising:
   a hardware-encoded internal private key, comprising a hardware-encoded fuse array not reasonably directly readable without destructively examining the electronic apparatus; and
   one or more logic elements comprising a passive key generation engine, the key generation engine having write permission only to one or more special-purpose memory locations for storing pseudo-unique hardware-generated dynamic identifiers (HGDIs), the key generation engine comprising:
      circuitry to receive an unencrypted third-party key from a third party;
      function circuitry to apply a one-directional operation to the third-party key and the internal private key to generate a pseudo-unique HGDI, wherein the HGDI is unique and persistent with respect to the third party key; and
      derivation circuitry to derive a cypher of the public key and the function circuitry.

2. The electronic apparatus of claim 1, wherein the one or more logic elements are immutable hardware logic elements.

3. The electronic apparatus of claim 1, wherein the key generation engine is further to encrypt the HGDI.

4. The electronic apparatus of claim 1, wherein the key generation engine is further to encrypt the HGDI with a salt.

5. The electronic apparatus of claim 1, further comprising a filter to reject third-party keys not provided by a key authority.

6. The electronic apparatus of claim 1, wherein the one or more special-purpose memory locations are not read restricted.

7. The electronic apparatus of claim 1, wherein the one or more special-purpose memory locations are not read restricted to system-level resources.

8. The electronic apparatus of claim 1, further comprising means to mitigate a replay attack.

9. The electronic apparatus of claim 8, wherein the means comprise a temporal counter.

10. One or more tangible, non-transitory computer-readable storage mediums having stored thereon executable instructions for a processor of a hardware platform to provide passive key generation, wherein the instructions are to write only to one or more special-purpose memory locations for storing pseudo-unique hardware-generated dynamic identifiers (HGDIs), further operable to:
    provide an internal private key, comprising a hardware-encoded fuse array not reasonably directly readable without destructively examining the hardware platform;
    receive an unencrypted third-party key from a third party; and
    apply a one-directional operation to the third-party key and the internal private key to generate a pseudo-unique HGDI, wherein the HGDI is unique and persistent with respect to the third party key; and
    derive a cypher of the public key and the function circuitry.

11. The one or more tangible, non-transitory computer-readable storage mediums of claim 10, wherein the one or more storage mediums comprise immutable hardware logic elements.

12. The one or more tangible, non-transitory computer-readable storage mediums of claim 10, wherein the instructions are further to encrypt the HGDI with a salt.

13. The one or more tangible, non-transitory computer-readable storage mediums of claim 10, wherein the instructions are further to reject third-party keys not provided by a key authority.

14. The one or more tangible, non-transitory computer-readable storage mediums of claim 10 wherein the one or more special-purpose memory locations are not read restricted to system-level resources.

15. The one or more tangible, non-transitory computer-readable storage mediums of claim 10, wherein the instructions are further to mitigate a replay attack.

16. The one or more tangible, non-transitory computer-readable storage mediums of claim 15, wherein the instructions are further to mitigate a replay attack comprising inspecting a temporal counter.

17. The one or more tangible, non-transitory computer-readable storage mediums of claim 10, wherein providing the internal private key comprises deriving the internal private key from a value encoded in hardware.

18. The one or more tangible, non-transitory computer-readable storage mediums of claim 17, wherein deriving the internal private key from the value encoded in hardware comprises applying a one-way function to the value encoded in hardware.

19. A method of providing a hardware-generated device identifier (HGDI) engine within immutable hardware of an electronic apparatus, the HGDI engine having write permission only to one or more special-purpose memory locations for storing pseudo-unique HGDIs, comprising providing passive key generation, and further comprising:
    providing a hardware-encoded internal private key, comprising a hardware-encoded fuse array not reasonably directly readable without destructively examining the electronic apparatus;
    receiving an unencrypted third-party key from a third party; and
    applying a one-directional operation to the third-party key and the internal private key to generate a pseudo-unique HGDI, wherein the HGDI is unique and persistent with respect to the third party key; and
    deriving a cypher of the public key and the function circuitry.

20. The method of claim 19, further comprising encrypting the HGDI with a salt.

21. The method of claim 19, further comprising rejecting third-party keys not provided by a key authority.

\* \* \* \* \*